(12) United States Patent
Yoshida

(10) Patent No.: US 6,811,270 B2
(45) Date of Patent: Nov. 2, 2004

(54) MIRROR DEVICE FOR VEHICLE

(75) Inventor: Shigeki Yoshida, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 105 days.

(21) Appl. No.: 10/098,623

(22) Filed: Mar. 18, 2002

(65) Prior Publication Data

US 2002/0130241 A1 Sep. 19, 2002

(30) Foreign Application Priority Data

Mar. 19, 2001 (JP) ........................................ 2001-079504

(51) Int. Cl.[7] .............................. G02B 5/08; G02B 7/18
(52) U.S. Cl. ........................ 359/841; 359/507; 359/877
(58) Field of Search ................................ 359/841, 872, 359/877, 507, 513, 514; 248/476, 479

(56) References Cited

U.S. PATENT DOCUMENTS

| | | | |
|---|---|---|---|
| 5,514,940 A | | 5/1996 | Okamoto |
| 5,579,178 A | * | 11/1996 | Mochizuki ................... 359/841 |
| 5,625,502 A | * | 4/1997 | Hoogenboom et al. ...... 359/872 |
| 5,734,517 A | * | 3/1998 | Kang ........................... 359/877 |

FOREIGN PATENT DOCUMENTS

| | | |
|---|---|---|
| EP | 0 314 135 A1 | 5/1989 |
| EP | 0 686 524 A1 | 6/1995 |
| EP | 0 764 562 A2 | 9/1996 |
| JP | 07-285380 | 10/1995 |

OTHER PUBLICATIONS

European Search Report Dated May 11, 2004.

* cited by examiner

Primary Examiner—Mark A. Robinson
(74) Attorney, Agent, or Firm—Nixon Peabody, LLP

(57) ABSTRACT

A mirror device for a vehicle, capable of preventing entrance of water into a motor case, and capable of ensuring smooth and appropriate rotation of the motor case even if a soft material is used for a cover. A supporting cylinder formed at a bottom wall portion of the motor case is rotatably supported at a lower end side of a shaft. A cylindrical member is formed continuously from a motor base having the same rigidity as the motor case. An upper end portion of the shaft is covered with the cylindrical member, which is rotatably supported by the shaft. The motor case and the motor base are interlocked, so they are rotatably supported together on the upper and lower ends of the shaft, and smooth rotation of the motor case can be ensured. Entrance of water between the shaft and the cover is prevented by the cylindrical member.

22 Claims, 4 Drawing Sheets

MIRROR DEVICE FOR VEHICLE

BACKGROUND OF THE INVENTION

1. Field of the Invention

The present invention relates to a mirror device for a vehicle.

2. Description of the Related Art

As a so-called door mirror provided outside of an occupant's seat of a vehicle cabin, an electrically powered mirror device to be rotated by a motor's driving force between a usage state, in which the reflection surface of a reflection mirror is directed substantially rearward of the vehicle, and a folded state, in which the same is directed substantially to the inside of the cabin in the vehicle width direction, can be presented (As an example thereof, see Japanese Patent Application Laid-Open (JP-A) No. 7-285380).

A vehicle mirror device of this kind, in general, has a motor case for accommodating a motor fixed on the vehicle body and rotatably supported by a cylindrical shaft provided upright from a stand. Furthermore, an adjusting actuator for adjusting the mirror surface angle of the reflection mirror is fixed to the motor case so that the reflection mirror is interlocked with the motor case via the adjusting actuator.

Moreover, an interlocking portion inside a substantially box-shaped or substantially bowl-shaped visor to be integrally interlocked with the visor is formed on the adjusting actuator. By interlocking the visor with the interlocking portion, the motor case, the adjusting actuator and the reflection mirror can be accommodated inside the visor.

The motor in the motor case is interlocked with a final gear provided integrally with the shaft via a speed reduction gearing. When electric power is supplied from a mounted battery to the motor via a harness provided in the shaft, the motor works to rotate the final gear by rotational force via the speed reduction gear. However, since the shaft with the final gear provided integrally is formed on the stand provided integrally with the vehicle body, the motor cannot rotate the final gear by its own driving force and so is rotated around the shaft by its own rotational force due to reaction force from the final gear. Thus, the motor case, the adjusting actuator, the visor and the reflection mirror are rotated integrally.

Since the vehicle mirror device is provided outside the vehicle cabin, in order to prevent entrance of rain water to the motor case, a cover is provided on the motor case for sealing an opening end of the motor case. Furthermore, prevention of entrance of rain water and the like into the motor case between the shaft's outer circumference and the cover, by so-called faucet fitting of the cover at a distal end portion of the shaft, has been considered.

In the above-mentioned configuration, the motor case is rotatably supported by the shaft about a lower end of the shaft, and the cover is pivoted about the shaft at an upper end side of the shaft. If the cover is made of a relatively soft material, the cover may be distorted at the time of rotation around the shaft, and consequently backlash with respect to the shaft may be generated. When backlash is generated, substantially only the motor case is pivoted about the shaft lower end side, and thus smooth and appropriate rotation is difficult to execute.

SUMMARY OF THE INVENTION

In view of the above-mentioned problems, an object of the present invention is to obtain a mirror device for a vehicle capable of preventing entrance of water into a motor case, and capable of ensuring smooth and appropriate rotation of the motor case even when a soft material is used for a cover.

In order to achieve the above-mentioned object, according to one aspect of the present invention, there is provided an electrically powered foldable mirror device for a vehicle, the mirror device including: a substantially cylindrical shaft including an upper end portion with a hollow interior, and a lower end portion; a case including a first fitting portion fitting at the outer circumference of the shaft lower end portion for mounting the case to the shaft; a mirror main body directly or indirectly supported by the case; and a motor base mounted to the case and including a second fitting portion sealingly fitted with the shaft upper end portion such that the case and the motor base are rotatably supported along the vertical direction of the shaft by the first fitting portion and the second fitting portion, the second fitting portion including a first hole in fluid communication with the interior of the shaft upper end portion.

DETAILED DESCRIPTION OF THE PREFERRED EMBODIMENT

Figure 4:
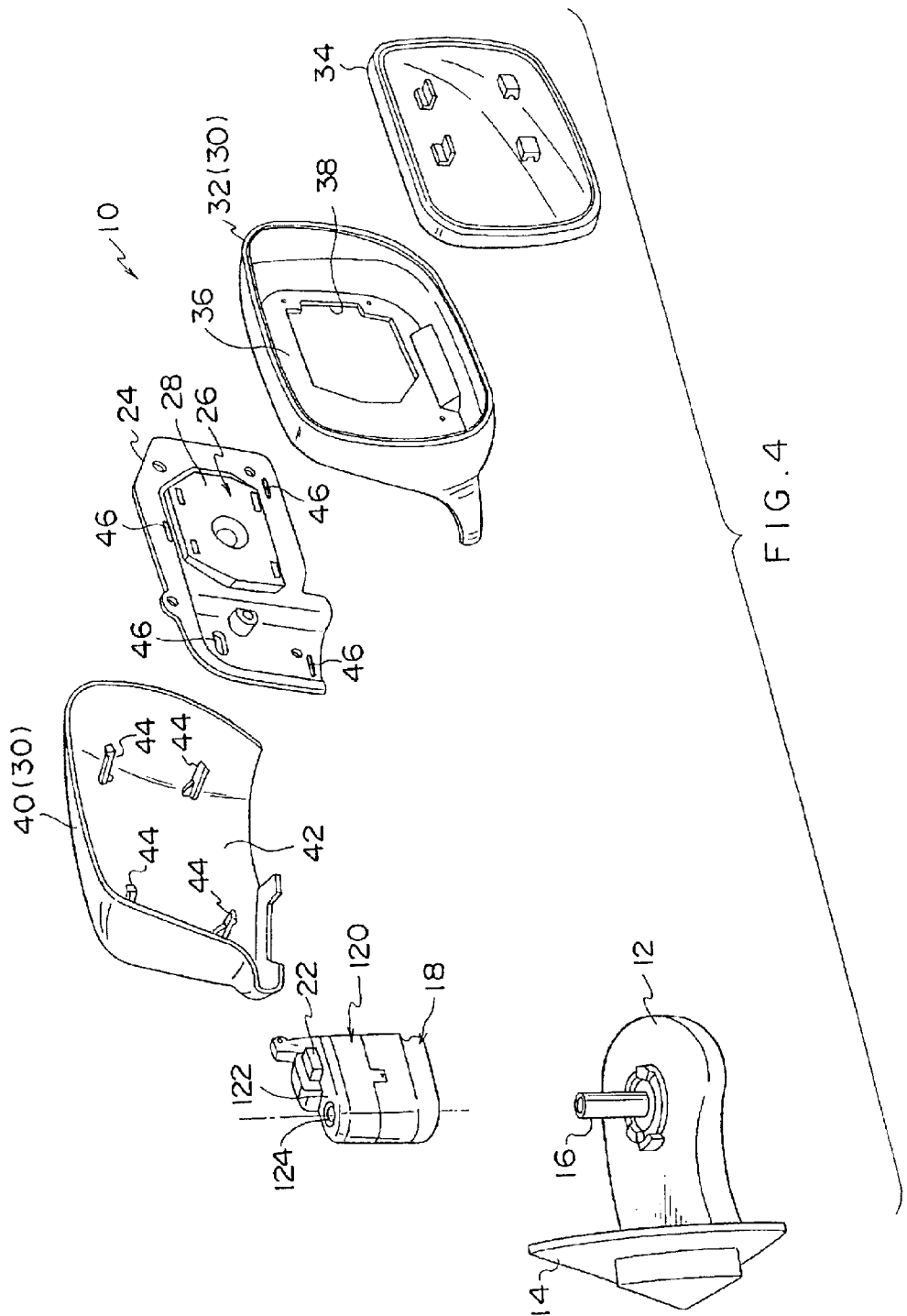
FIG. 4 is an exploded perspective view of the mirror device for a vehicle according to the embodiment.

FIG. 4 is an exploded perspective view of an electrically powered door mirror device 10, which is a mirror device for a vehicle according to an embodiment of the present invention.

First, the overall schematic configuration of the electrically powered door mirror device 10 will be explained.

As shown in FIG. 4, the electrically powered door mirror device 10 includes a stand 12. The stand 12 is made of a metal material having at least a predetermined rigidity or the like, and is formed in a substantially plate-like form with a thickness direction disposed substantially along the vertical direction of the vehicle (not shown). The stand 12 is disposed, for example, sideward at a front end side of a door panel corresponding to an occupant's seat of the vehicle.

A stay 14 is formed integrally with the stand 12 substantially at the inside of a cabin in the vehicle width direction. The stay 14 is made of the same material as the stand 12 in a plate-like form with the thickness direction disposed substantially along the vehicle width direction. The stay 14 is integrally interlocked with the door panel. Thus, the stand 12 is fixed on the vehicle.

A cylindrical shaft 16 is provided upright on an upper surface of the stand 12. The shaft 16 accommodates a wire harness 17 as shown in phantom in FIGS. 2 and 3. The shaft 16 is inserted through a bottom wall portion 20 of a substantially box-like motor case 18 (see FIG. 1) and supports the motor case 18 rotatably around the axis of the shaft 16.

Furthermore, as shown in FIG. 4, a plate-like supporting piece 22 is elongated from a portion of the outer circumference of the motor case 18. A plate-like bracket 24 with the thickness direction disposed in the same direction as the supporting piece 22 is provided on one side in the plate thickness direction of the supporting piece 22. By a fastening means such as a bolt, the supporting piece 22 and the bracket 24 are fixed integrally.

A housing 28 of an angle adjusting actuator 26 is mounted on one side in the thickness direction of the bracket 24. One or a plurality of motors and one or a plurality of speed reduction gears provided corresponding to each motor are accommodated in the housing 28. Moreover, a visor rim 32 formed by a visor 30 is disposed on one side in the thickness direction of the bracket 24. The visor rim 32 is formed in a shallow substantially box-like shape or substantially bowl-like shape, opened in substantially the same direction as the one side in the thickness direction of the bracket 24. A plate-like mirror main body 34 is accommodated therein with the reflection direction disposed substantially on the opening direction side of the visor rim 32.

The mirror main body 34 is supported on a supporting shaft (not shown) of the housing 28 provided through a hole 38 formed in a bottom wall portion 36 of the visor rim 32. By transmitting the driving force of a motor of the housing 28 to the supporting shaft via speed reduction gearing of the housing 28, the mirror main body 34 is rotated around axes substantially in the vehicle width direction and the vertical direction of the vehicle, so that the reflection angle of the mirror main body 34 can be changed optionally.

Also, the electrically powered door mirror device 10 includes a visor cover 40 formed by a visor 30 together with the visor rim 32. The visor cover 40 is formed in a substantially box-like or substantially bowl-like shape deeper than the visor rim 32. By fitting the visor rim 32 into the visor cover 40, and further fitting a plurality of interlocking ribs 44 provided extending from a bottom wall portion 42 of the visor cover 40 into an interlocking hole 46 formed in the bracket 24, the visor cover 40 is interlocked mechanically with the visor rim 32 and the bracket 24 so that the visor cover 40 accommodates the motor case 18, the bracket 24, the angle adjusting actuator 26, the visor rim 32 and the mirror main body 34 therein.

Accordingly, since the bracket 24, the angle adjusting actuator 26, the visor rim 32, the mirror main body 34 and the visor cover 40 are interlocked mechanically with the motor case 18 as mentioned above, by rotating the motor case 18 around the shaft 16, the bracket 24, the angle adjusting actuator 26, the visor rim 32, the mirror main body 34 and the visor cover 40 are rotated as well.

Next, the configuration of the principal parts of the electrically powered door mirror device 10 will be explained.

Figure 1:
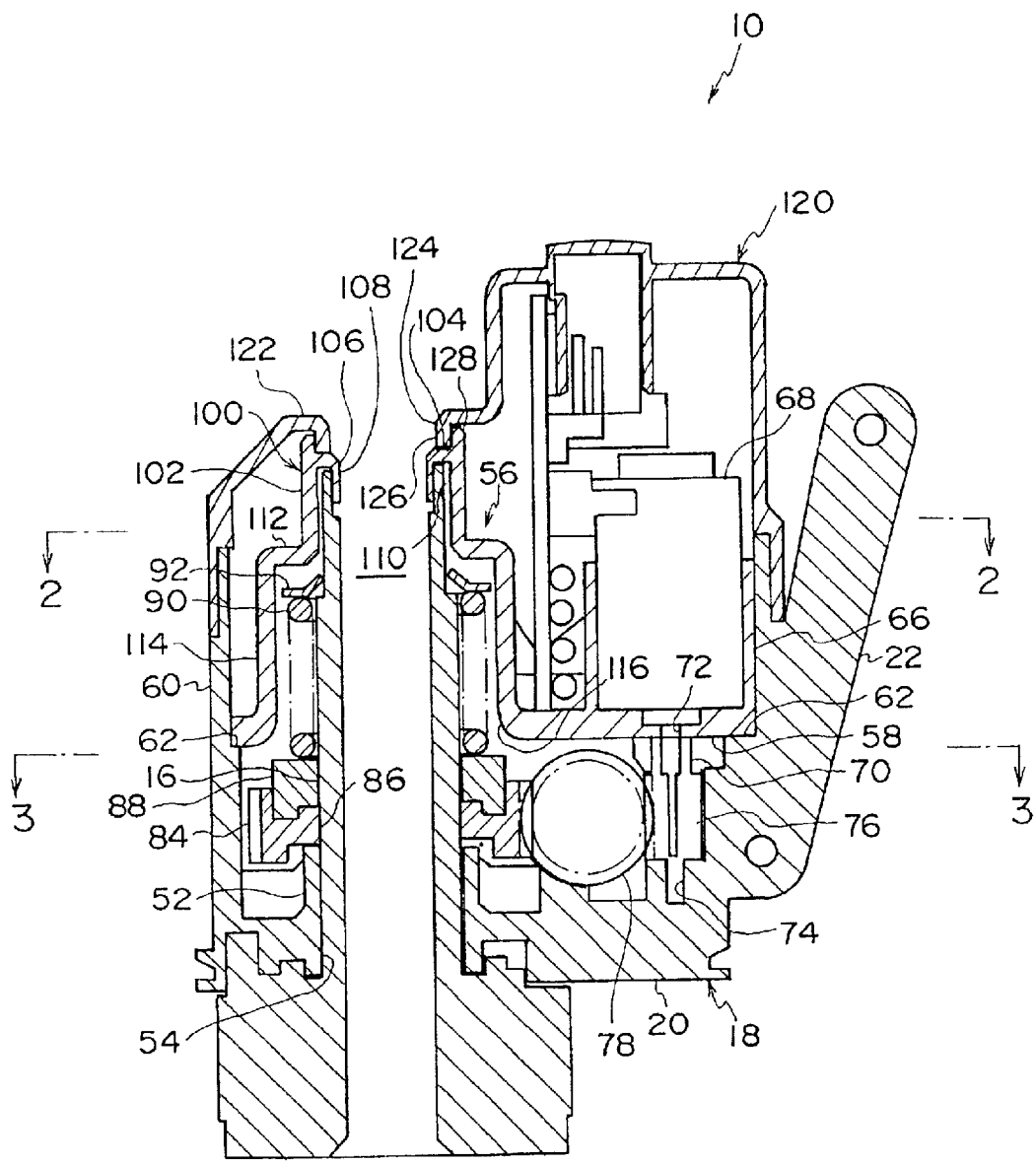
FIG. 1 is a vertical cross-sectional view of principal parts of a mirror device for a vehicle according to an embodiment of the present invention.

FIG. 1 is a vertical cross-sectional view showing the principal parts configuration of the electrically powered door mirror device 10. As mentioned above, in the electrically powered door mirror device 10, the motor case 18 is formed in a substantially box-like shape. More specifically, as shown in FIG. 1, the motor case 18 has a substantially box-like shape with the upper end opened.

A cylindrical supporting cylinder 52 having an inner diameter size substantially the same as the outer diameter size of the shaft 16 (strictly speaking, slightly larger, to allow fitting and inserting of the shaft 16) is provided on the motor case 18. The supporting cylinder 52 is provided extending from the bottom wall portion 20 substantially concentrically with a round hole 54 formed in the bottom wall portion 20, through which the shaft 16 is inserted. By fitting and inserting the shaft 16 through the round hole 54 into the supporting cylinder 52, the supporting cylinder 52 and the motor case 18 are rotatably supported.

Figure 2:
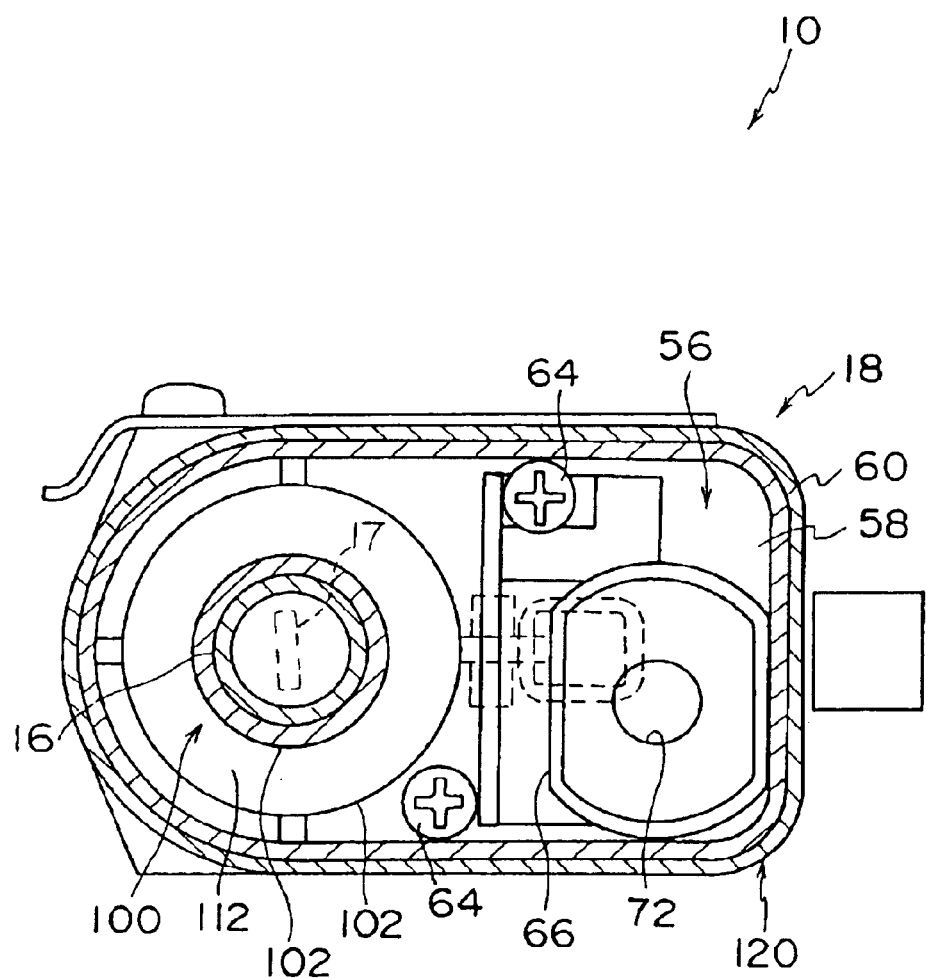
FIG. 2 is a cross-sectional view taken on the line 2—2 of FIG. 1.

Furthermore, a motor base 56 is disposed inside the motor case 18, at the opening end side of the motor case 18 away from the bottom wall portion 20. The motor base 56 includes a substantially flat plate-like base plate 58 which is a base main body. The base plate 58 is placed on a fitting base 62 formed continuously or intermittently along the circumferential direction of a circumferential wall portion 60 of the motor case 18. Moreover, the outer circumferential shape of the base plate 58 corresponds to the inner circumferential shape of the circumferential wall portion 60 so that the base plate 58 is fitted in the circumferential wall portion 60, and the base plate 58 and the motor case 18 are coupled integrally by screws 64 as shown in FIG. 2.

Figure 3:
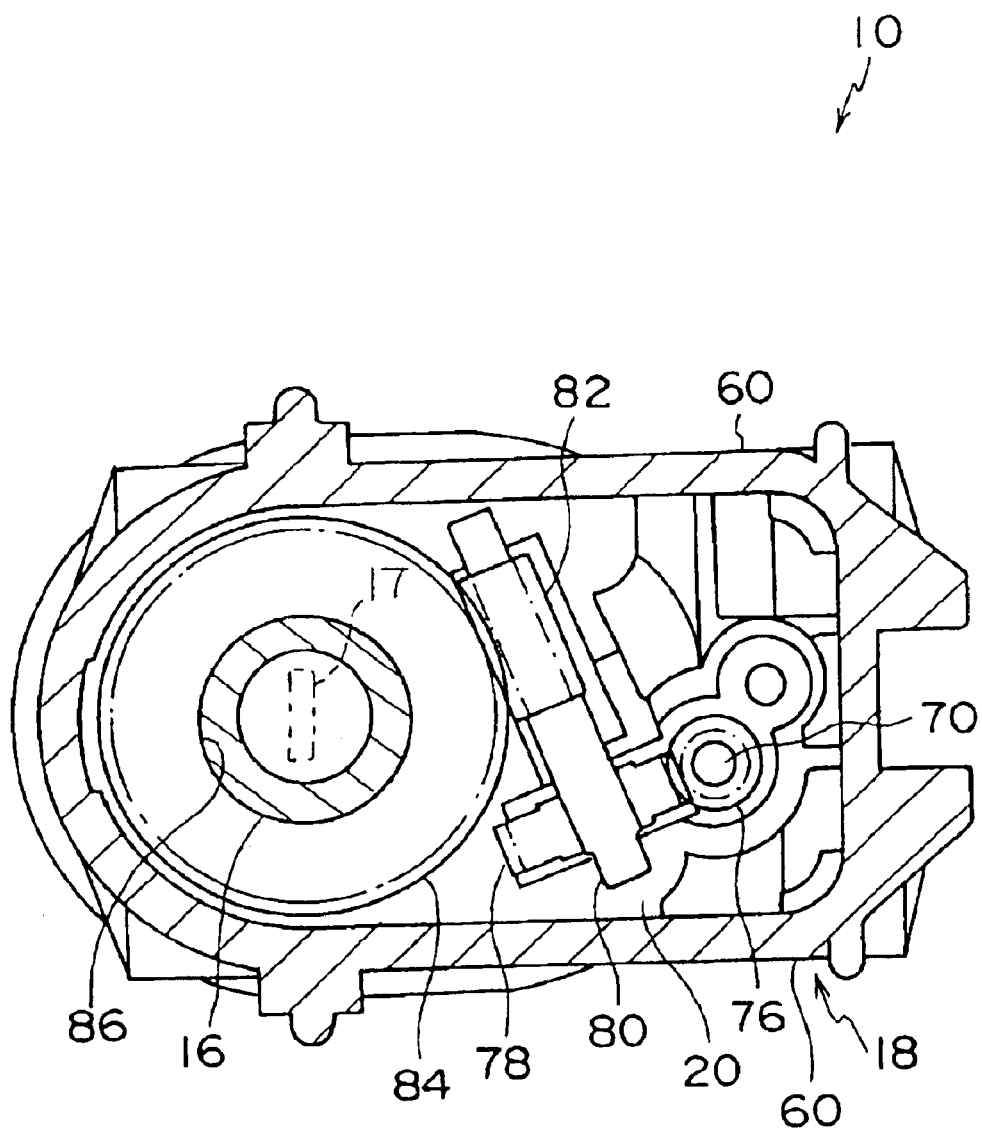
FIG. 3 is a cross-sectional view taken on the line 3—3 of FIG. 1.

As shown in FIG. 1 and FIG. 3, a motor holding cylinder 66 is formed on the base plate 58. The motor holding cylinder 66 has a substantially oval inner circumferential shape corresponding to an outer circumferential shape of a motor 68. The motor 68 is accommodated in the motor holding cylinder 66 with a rotation shaft 70 thereof oriented downward. Thus, the motor 68 is held by the motor holding cylinder 66.

Moreover, as shown in FIG. 1, a round hole 72 is formed in the base plate 58 corresponding to the rotation shaft 70 in the state with the motor 68 accommodated in the motor holding cylinder 66. The rotation shaft 70 placed through the round hole 72 is projected to a side of the base plate 58 opposite to the side thereof at which the motor holding cylinder 66 is disposed, and is rotatably supported at a bearing hole 74 formed in the bottom wall portion 20. Furthermore, as shown in FIG. 3, a worm gear 76, which is a speed reduction gear, is fixed on a side of the base plate 58 opposite to the side thereof at which the motor holding cylinder 66 is disposed, concentrically and integrally with the rotation shaft 70.

A worm wheel 78, which is a speed reduction gear, is disposed sideways of the worm gear 76 so as to be engaged with the worm gear 76. As shown in FIG. 3, an interlocking shaft 80 is fitted and inserted in the axis center of the worm wheel 78. A worm gear 82, which is a speed reduction gear, is fitted onto the interlocking shaft 80 concentrically and integrally, and so as to be engaged with a worm wheel 84, which is a final gear provided sideways of the worm gear 82 at an end of the interlocking shaft 80 opposite to the end thereof at which the rotation shaft 70 is disposed.

As shown in FIG. 1, the shaft 16 is fitted and inserted in a through hole 86 formed in the axis center of the worm wheel 84 so that the worm wheel 84 is rotatably supported around the shaft 16. Moreover, a clutch plate 88 is disposed at a side of the worm wheel 84 opposite to a side thereof at which the supporting cylinder 52 is disposed. Furthermore, a compression coil spring 90 is disposed at a side of the clutch plate 88 opposite to a side thereof at which the worm wheel 84 is disposed. The compression coil spring 90 has one end thereof contacted with a fixed washer 92 fixed on the shaft 16 and the other end contacted with the clutch plate 88 so as to pressure the clutch plate 88 to the worm wheel 84 side by the spring's urging force.

The above-mentioned clutch plate 88 is fitted in the worm wheel 84 basically unrotatably with respect to the shaft 16. Moreover, the clutch plate 88 is also engaged with the worm wheel 84 relatively unrotatably, due to the urging force of the compression coil spring 90. Therefore, although the shaft 16 can, in itself, be rotated freely with respect to the worm wheel 84, since the clutch plate 88 is engaged with the worm wheel 84, basically the worm wheel 84 cannot be relatively rotated with respect to the shaft 16.

However, when an external force of a predetermined value or more is applied around the shaft 16 to the worm wheel 84, the worm wheel 84 is forcibly released from engagement with the clutch plate 88 temporarily so as to enable relative rotation of the worm wheel 84 with respect to the shaft 16 according to the external force.

As shown in FIG. 1, a cylindrical member 100 is provided in the vicinity of the upper end portion of the shaft 16. The cylindrical member 100 includes an outer cylinder 102 having an inner diameter size larger than the outer diameter size of the shaft 16. The distal end portion (upper end portion) of the shaft 16 is fitted and inserted into the inside of the outer cylinder 102. Moreover, an upper bottom portion 104 is formed at an upper end portion of the outer cylinder 102, which faces the distal end portion of the shaft 16 fitted and inserted in the outer cylinder 102. A round hole 106 is formed in the upper bottom portion 104 concentrically with the outer cylinder 102 and the shaft 16. The inner diameter size of the round hole 106 is sufficiently smaller than the inner diameter size of the shaft 16 at the distal end portion of the shaft 16. Furthermore, an inner cylinder 108 is formed from the inner circumferential rim of the round hole 106 toward the stand 12.

The inner cylinder 108 has an outer diameter size substantially the same as the inner diameter size of the shaft 16 at the distal end portion of the shaft 16 (strictly speaking, slightly larger), and is fitted and inserted into the shaft 16 from the distal end portion of the shaft 16 and into the vicinity thereof (that is, the cylindrical member 100 is faucet fitted into the distal end portion of the shaft 16 rotatably around the axis of the shaft 16). Therefore, the distal end portion of the shaft 16 is covered with the cylindrical member 100 and is entered into a ring-like gap 110, which is a groove formed between the outer cylinder 102 and the inner cylinder 108.

In contrast, a ring-like flange portion 112 is elongated concentrically toward the radial direction outer side of the outer cylinder 102 from an opening end (lower end) of the outer cylinder 102. Furthermore, a large diameter cylinder portion 114 is formed from an outer circumferential portion of the flange portion 112 concentrically along the axial direction of the outer cylinder 102 toward the lower end of the shaft 16. Moreover, an end portion of the large diameter cylinder portion 114, at an end thereof opposite to the end thereof at which the flange portion 112 is disposed, is interlocked with the base plate 58 at the circumferential rim of a round hole 116, which is formed in the base plate 58 with an inner diameter size substantially the same as the inner diameter size of the large diameter cylinder portion 114, such that the cylindrical member 100 and the motor 68 are provided integrally.

The above-mentioned compression coil spring 90 enters into the large diameter cylinder portion 114 through the round hole 116, and the fixed washer 92 is accommodated in the large diameter cylinder portion 114 as well.

Furthermore, a substantially box-shaped cover 120 opening downward is provided on the upper side of the motor case 18. The cover 120 is fitted by its lower side opening end to the upper side opening end of the motor case 18. Basically the cover 120 closes the upper side opening end of the motor case 18 such that the above-mentioned motor 68 or the like is accommodated in an inner space of the motor case 18 and the cover 120.

A round hole 124 is formed in an upper base portion 122 of the cover 120. The round hole 124 is formed concentrically with the shaft 16. A harness (not shown) for supplying electric power from a battery mounted on the vehicle is provided through the inside of the shaft 16 and the inner cylinder 108, and further the harness is connected mechanically and electrically with a connector (not shown) formed in the cover 120 or the motor case 18 so as to be connected electrically with the motor 68 via the connector.

Moreover, a ring-like engaging ring 126 is provided in the cover 120. The engaging ring 126 is formed in the upper base portion 122 concentrically with the round hole 124. A ring-like water entrance prevention ring 128 is formed as a water entrance prevention wall on the upper bottom portion 104 of the cylinder 100, corresponding to the engaging ring 126. The engaging ring 126 and the water entrance prevention ring 128 are provided concentrically. Furthermore, the inner diameter size of the water entrance prevention ring 128 is substantially the same as the outer diameter size of the engaging ring 126, such that the engaging ring 126 is fitted and inserted into the water entrance prevention ring 128.

Hereinafter, the basic operation of the electrically powered door mirror device 10 will be explained.

According to the electrically powered door mirror device 10 with the above-described configuration, when the electric power of the battery mounted on the vehicle is supplied to the motor 68 so as to start rotation of the rotation shaft 70, the rotation of the rotation shaft 70 is transmitted to the worm wheel 84 via the worm gear 76, the worm wheel 78, the interlocking shaft 80 and the worm gear 82, which reduce the speed.

As mentioned above, the worm wheel 84 is provided relatively rotatably with respect to the shaft 16, however, since the clutch plate 88 is engaged with the worm wheel 84 by the urging force of the compression coil spring 90, the worm wheel 84 cannot be rotated relatively with respect to the shaft 16.

That is, since the worm wheel 84 and the shaft 16 are provided virtually integrally in an ordinary state, and further the shaft 16 is interlocked integrally with the door panel of the vehicle via the stand 12 and the stay 14, even when the rotational force of the motor 68 is applied to the worm wheel 84 with the speed reduced, the worm wheel 84 cannot be rotated, so that the motor 68 is rotated around the shaft 16 by reaction force due to the rotational force applied to the worm wheel 84.

The motor 68 held by the motor holding cylinder 66 is provided basically integrally with the motor base 56. Moreover, the motor base 56 is coupled integrally with the motor case 18. Therefore, when the motor 68 is rotated around the shaft 16, the motor case 18 is rotated around the shaft 16, and furthermore, the bracket 24 interlocked with the supporting piece 22 of the motor case 18 is rotated. Thus, the angle adjusting actuator 26, the mirror main body 34 and the visor 30 are rotated integrally.

Accordingly, by rotating the angle adjusting actuator 26, the mirror main body 34 and the visor 30, the mirror main body 34 can be moved from the folded state, at which the reflection surface is oriented substantially to the inside of the cabin in the vehicle width direction, to the use state, at which the reflection surface is oriented substantially to the rearward of the vehicle, and from the use state to the folded state.

According to the electrically powered door mirror device 10, since the lower side opening end of the cover 120 is fitted to the upper side opening end of the motor case 18 so as to cover the upper side opening end of the motor case 18, entrance of rain water and the like into the motor case 18 can basically be prevented by the cover 120.

According to the electrically powered door mirror device 10, since the round hole 124 is formed in the upper base portion 122 of the cover 120 for introduction of the above-mentioned harness, ingress of rain water and the like through the round hole 124 into the motor case 18 between the upper base portion 122 and the upper end portion of the shaft 16 is a concern.

However, according to the electrically powered door mirror device 10, since the engaging ring 126 formed in the upper base portion 122 concentrically with the round hole 124 is fitted and inserted into the water entrance prevention ring 128 formed in the upper bottom portion 104, even when rain water enters between the end portion of the engaging ring 126 and the upper bottom portion 104, the water is blocked by the water entrance prevention ring 128, so that the rain water and the like cannot enter into the motor case 18.

Moreover, since the distal end portion (upper end portion) of the shaft 16 enters into the gap 100 between the outer cylinder 102 and the inner cylinder 108 of the cylindrical member 100, rain water and the like cannot enter between the distal end portion of the shaft 16 and the upper bottom portion 104.

Therefore, according to the electrically powered door mirror device 10, basically there is no risk of intrusion of rain water and the like into the motor case 18 through the round hole 124. Therefore, operational failures, malfunctions and the like of the motor 68 caused by entrance of rain water and the like into the motor case 18 can be assuredly prevented.

According to the electrically powered door mirror device 10, the motor case 18 and the motor base 56 are firmly interlocked and integrated by fitting the base plate 58 into the circumferential wall portion 60 and fastening the screws 64.

Here, according to the electrically powered door mirror device 10, since the cylindrical member 100 fitted ("faucet fitted") into the distal end portion (upper end portion) of the shaft 16 is provided continuously with the base plate 58 via the flange portion 112 and the large diameter cylindrical portion 114, the gap 110 is a part of the motor base 56. Therefore, the motor base 56 is rotatably supported on the distal end portion (upper end portion) of the shaft 16 by the gap 110. In contrast, the motor case 18 is rotatably supported on the shaft 16 by the supporting cylinder 52 formed in the bottom wall portion 20.

As mentioned above, also in consideration of the fact that the motor case 18 and the motor base 56 are provided integrally, since the motor case 18 and the motor base 56 are rotatably supported at both end portions of the shaft 16 via the supporting cylinder 52 and the cylindrical member 100, even when the cover 120 is made of a relatively soft material, backlash or vibration of the motor case 18 and the motor base 56 in a direction of tilting with respect to the shaft 16 axis direction can be prevented or effectively alleviated, so as to ensure smooth and appropriate rotation with respect to the shaft 16.

Furthermore, according to the electrically powered door mirror device 10, since both the motor case 18 and the motor base 56 are made of a metal material or the like having the same rigidity, a high rigidity is provided, so that there is no risk of distortion of the motor case 18 or the motor base 56 at a time of rotation around the shaft 16 or the like. Therefore, also in this context, backlash or vibration of the motor case 18 and the motor base 56 in the direction tilted with respect to the shaft 16 axis direction can be prevented or effectively alleviated so as to ensure smooth and appropriate rotation with respect to the shaft 16.

The present invention is not limited to the electrically powered door mirror device 10 shown in the figures. For example, the present invention can be adopted to an optional mirror device for a vehicle with a configuration of rotating a mirror main body.

As heretofore explained, according to the present invention, entrance of water into the motor case can be prevented, and furthermore, even when the cover is made of a soft material, smooth and appropriate rotation of the motor case can be ensured.

What is claimed is:

1. An electrically powered foldable mirror device for a vehicle, the mirror device comprising:
    a tubular shaft including an upper end portion and a lower end portion;
    a case including a first fitting portion fitting at the outer circumference of the shaft lower end portion for mounting the case to the shaft;
    a mirror main body directly or indirectly supported by the case;
    a motor base mounted to the case and including a second fitting portion sealingly fitted with the shaft upper end portion such that the case and the motor base are rotatably supported along the vertical direction of the shaft by the first fitting portion and the second fitting portion, the second fitting portion including a first hole in fluid communication with the interior of the shaft upper end portion, and
    a cover having a cover portion, which cover portion is fitted on the second fitting portion of the motor base in such a manner that the second fitting portion is interposed between the cover position and the shaft upper end portion.

2. A mirror devise according to claim 1, further comprising a stand which is mountable to a vehicle body and from which the shaft extends upward.

3. A mirror device according to claim 1, further comprising an electric motor for folding, which is mounted on the motor base.

4. A mirror device according to claim 1, further comprising a wire harness introduced through the interior of the shaft and the first hole.

5. A mirror device according to claim 1, wherein the first fitting portion comprises a supporting cylinder including an inner circumferential surface that fits with the outer circumference of the shaft.

6. A mirror device according to claim 1, further comprising a positioning mechanism capable of holding the mirror main body at each of a usage position and a folded position.

7. A minor device according to claim 6, wherein the positioning mechanism is disposed between the shaft and the case.

8. A minor device according to claim 1, further comprising a motor with an output shaft, and a speed reduction mechanism disposed in the case and engaging with the motor output shaft.

9. A minor device according to claim 8, wherein the speed reduction mechanism comprises a ring gear fixed to the outer circumference of the shaft.

10. A mirror according to claim 1, wherein the case and the motor base each comprise a metal material.

11. A minor device according to claim 1, wherein the case comprises an opening which opens upward, and the motor base is insertingly mounted in the opening.

12. A mirror device according to claim 11, wherein said cover is closingly fitted with the opening of the case.

13. A mirror device according to claim 12, wherein the cover comprises a cap portion mounted to the second fitting portion of the motor base.

14. A mirror device according to claim 13, wherein the cap portion comprises a first engaging ring portion including a second hole, which is concentric with the first hole of the second fitting portion.

15. A mirror device according to claim 14, wherein the second fitting portion further comprises a second ring portion disposed concentrically with the first hole, and has an inner circumference slightly larger than the inner circumference of the first hole.

16. A mirror device according to claim 15, wherein the first engaging ring portion is fitted into the second ring portion.

17. A mirror device according to claim 1, wherein the second fitting portion comprises an inner cylinder portion disposed a the inner side of the shaft upper end portion, an outer cylinder portion disposed at the outer side of the shaft upper and portion, and a connecting portion connecting the inner cylinder portion and the outer cylinder portion with each other.

18. A mirror device according to claim 1, wherein the second fitting portion comprises a downwardly extending inner cylinder portion fitted with an inner circumferential surface of the shaft upper end portion.

19. A mirror device according to claim 18, wherein the inner cylinder portion forms a faucet joint with the shaft.

20. An electrically powered foldable mirror device for a vehicle as defined in claim 1, wherein said cover fitted on said second fitting portion that does not rotate relative to said second fitting portion.

21. An electrically powered foldable mirror device for a vehicle, the mirror device comprising:

a tubular shaft including an upper end portion and a lower end portion;

a case including a first fitting portion fitting at the outer circumference of the shaft lower end portion for mounting the case to the shaft;

a mirror main body directly or indirectly supported by the case; and a motor base mounted to the case and including a second fitting portion sealing fitted with the shaft upper end portion such that the case and the motor base are rotatably supported along the vertical direction of the shaft by the first fitting portion and the second fining portion, the second fitting portion including a first hole in fluid communication with the interior of the shaft upper end portion, and terminating in a first engaging ring portion, wherein the case includes a cover that has a second engaging ring portion that engages the first engaging ring portion.

22. An electrically powered foldable mirror device for a vehicle, the mirror device comprising:

a tubular shaft including an upper end portion and a lower end portion;

a case including a first fitting portion fitting at the outer circumference of the shaft lower end portion for mounting the case to the shaft;

a mirror main body directly or indirectly supported by the case; and a motor base mounted to the case and including a second fitting portion sealing fitted with the shaft upper end portion such that the case and the motor base are rotatably supported along the vertical direction of the shaft by the first fitting portion and the second fitting portion, the second fitting portion including a first hole in fluid communication with the interior of the shaft upper end portion, wherein said case includes a cover having a cap portion that sealingly engages a top portion of said second fitting.

* * * * *